United States Patent [19]
Desjardins

[11] Patent Number: 5,001,796
[45] Date of Patent: Mar. 26, 1991

[54] COMBINATION SCRAPER AND FILE TOOL

[76] Inventor: Warren Desjardins, 18 Bonita Rd., East Quogue, N.Y. 11942

[21] Appl. No.: 512,896

[22] Filed: Apr. 23, 1990

[51] Int. Cl.$^5$ ............................................... B25F 1/00
[52] U.S. Cl. .......................................... 7/105; 7/167; 30/125; 30/172
[58] Field of Search ................. 30/123, 125, 169, 172; 15/105; 7/105, 158, 167, 170; 29/78, 80

[56] References Cited

U.S. PATENT DOCUMENTS 2,776,484  1/1957  Resner .................................... 30/125
3,363,316  1/1968  Skarsten ................................... 7/105

Primary Examiner—Roscoe V. Parker
Attorney, Agent, or Firm—Richard L. Miller

[57] ABSTRACT

A combination scraper and file tool is provided in which the file tool is removably secured in a top recess of an elongated hand grip of the scraper so that the file tool is always handy, ready to be used independently and in conjunction with the scraper when the file tool is removed. The scraper is designed so that mechanism is provided for enabling one of a stored scraper blades to be simultaneously available as a separate operative scraping blade.

4 Claims, 2 Drawing Sheets

U.S. Patent     Mar. 26, 1991     Sheet 1 of 2     5,001,796
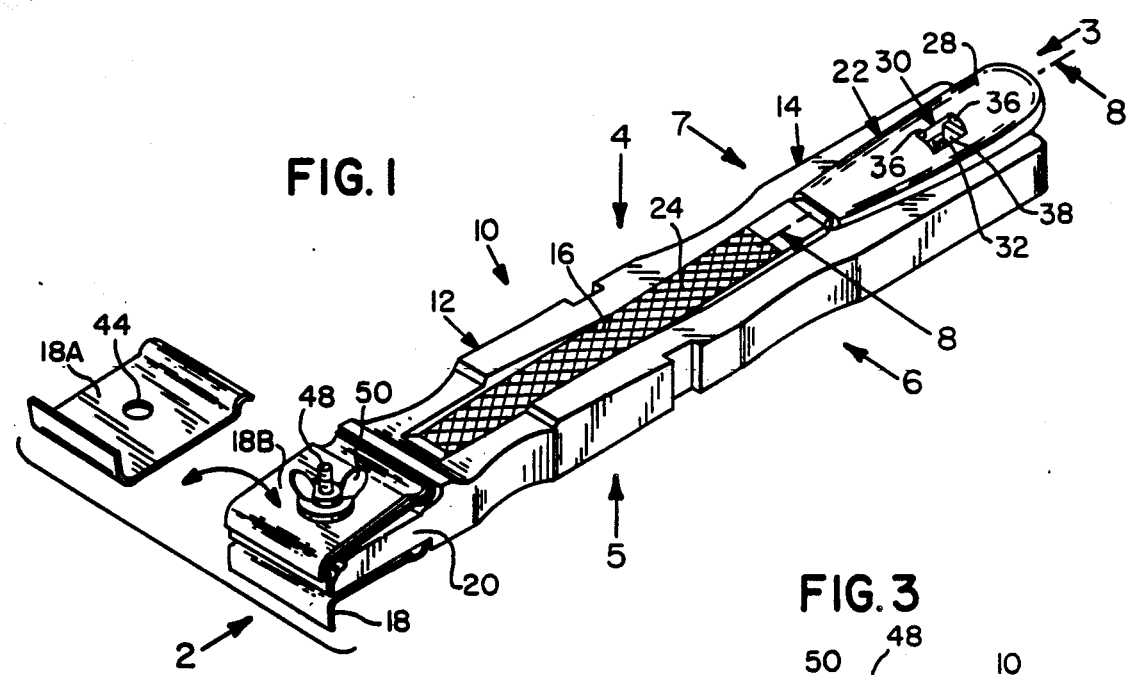
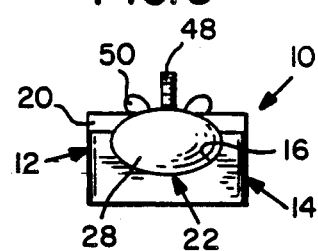
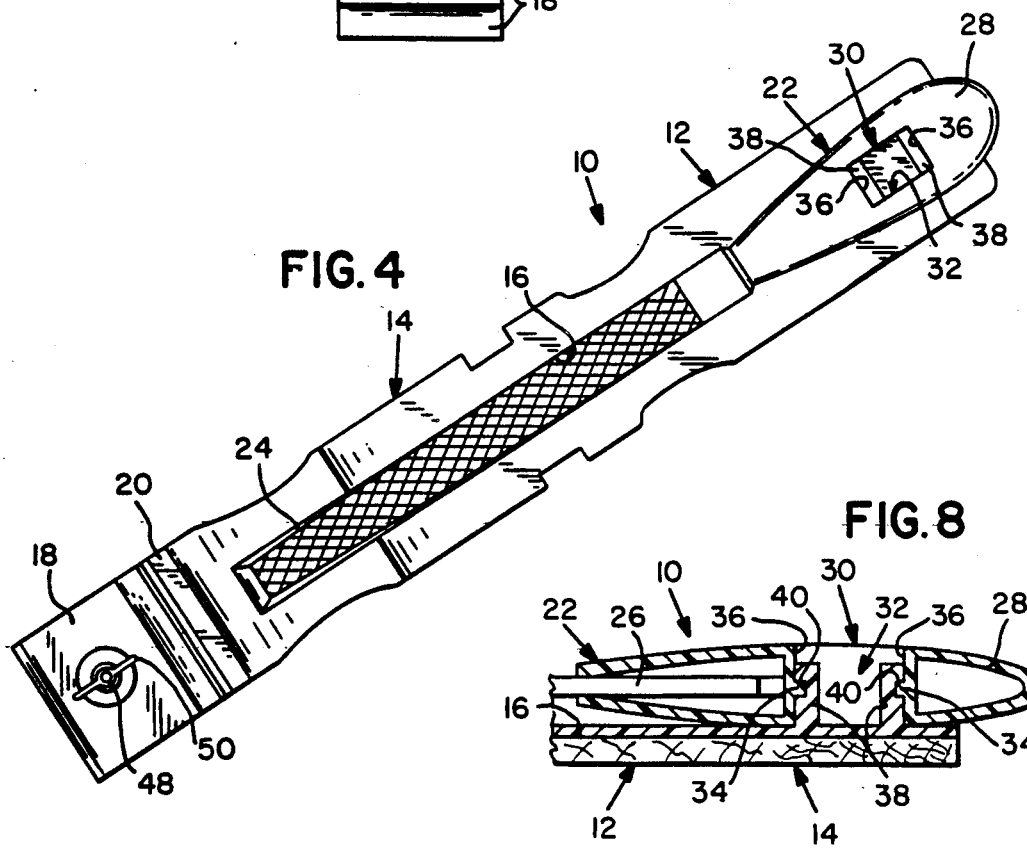

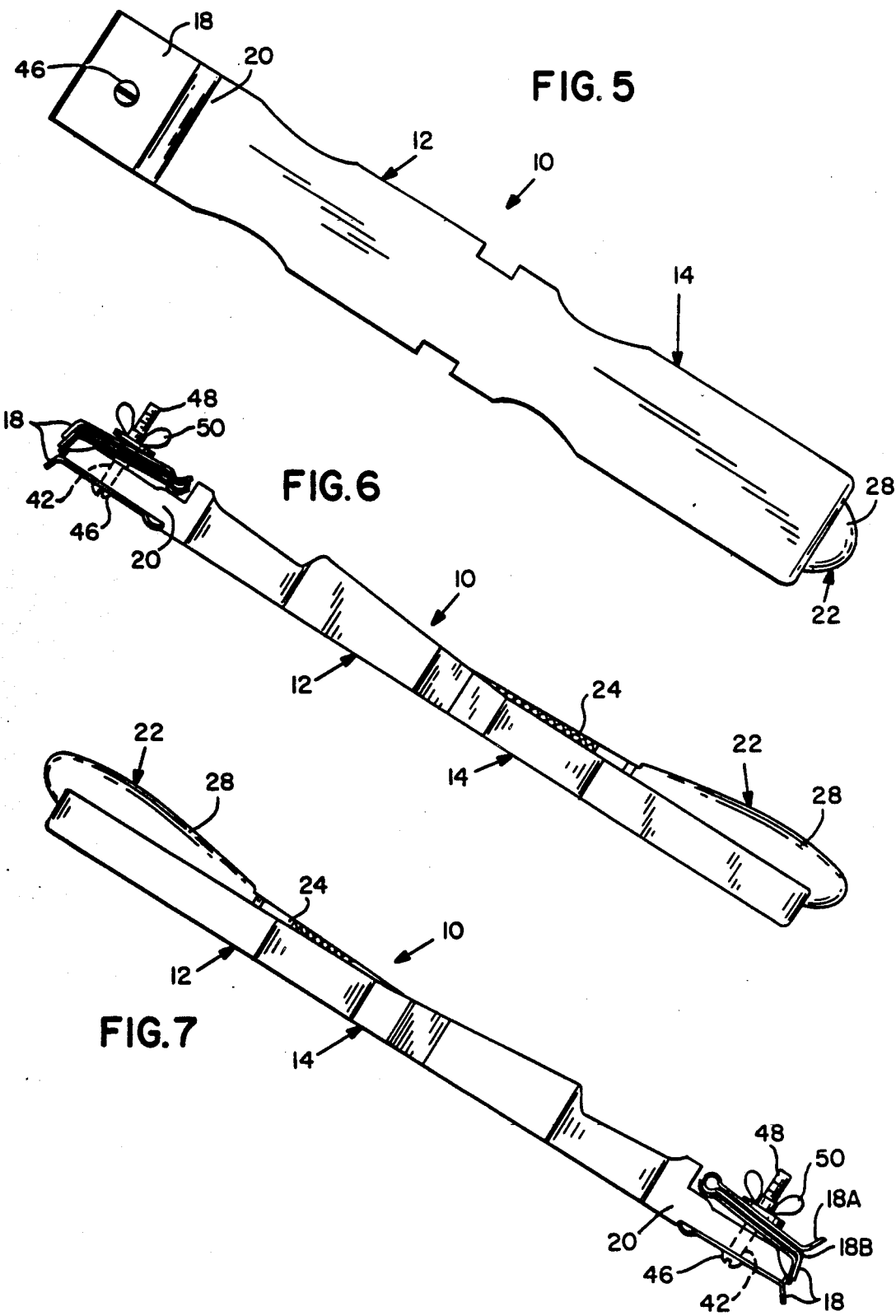

COMBINATION SCRAPER AND FILE TOOL

BACKGROUND OF THE INVENTION

The instant invention relates generally to hand tools and more specifically it relates to a combination scraper and file tool. Numerous hand tools have been provided in the prior art that are adapted to perform various operations for the people using the tools. While these units may be suitable for the particular purpose to which they address, they would not be as suitable for the purpose of the present invention as hereafter described.

SUMMARY OF THE INVENTION

A primary object of the present invention is to provide a combination scraper and file tool that will overcome the shortcomings of the prior art devices.

Another object is to provide a combination scraper and file tool in which the file tool is removably held within the elongated hand grip of the scraper so that the file tool is always handy.

An additional object is to provide a combination scraper and file tool in which the file tool once removed from the elongated hand grip of the scraper can be used independently or in conjunction with the scraper for sharpening the scraper.

A further object is to provide a combination scraper and file tool that is simple and easy to use.

A still further object is to provide a combination scraper and file tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention;

FIG. 2 is an end view taken in the direction of arrow 2 in FIG. 1;

FIG. 3 is an end view taken in the direction of arrow 3 in FIG. 1;

FIG. 4 is an elevational view taken in the direction of arrow 4 in FIG. 1;

FIG. 5 is an elevational view taken in the direction of arrow 5 in FIG. 1;

FIG. 6 is an elevational view taken in the direction of arrow 6 in FIG. 1;

FIG. 7 is an elevational view taken in the direction of arrow 7 in FIG. 1; and

FIG. 8 is a cross sectional view with parts broken away, taken on line 8—8 of FIG. 1.

DETAILED DESCRIPTION OF THE PREFERRED EMBODIMENTS

Turning now descriptively to the drawings, in which like reference characters denote like elements throughout the several views, FIGS. 1 through 8 illustrates a combination scraper and file tool 10 consisting of a scraper 12 which includes an elongated hand grip 14 having a top recess 16 therein and hooked scraper blades 18 removably attached to one end 20 of the elongated hand grip 14. A file handle 28 for attachment to a tang 26 of a file blade 24 in a conventional manner is provided to form a file tool 22. The file blade 24 can either be supplied with the combination scraper and file tool 10 by the distributor/manufacture or sold as a separate component depending upon the desires of the distributor/manufacture. The file blade 24 is sized to fit within the top recess 16 of the elongated hand grip 14. A structure 30 is utilized for removably securing the file handle 28 of the file tool 22 within the top recess 16 of the elongated hand grip 14 so that the file tool 22 is always handy, ready to be used independently and/or in conjunction with the scraper 12.

The structure 30, as best seen in FIG. 8, includes the file handle 28 of the file tool 22 having a transverse slot 32 therethrough, with a pair of male projections 34. Each male projection 34 is on an opposite wall 36 of the slot 32. A pair of upright fingers 38 are in the recess 16 of the elongated hand grip 14 of the scraper 12. Each finger 38 has a female indent 40 therein to receive one of the male projections 34 in the slot 32, when the file handle 28 is placed within the top recess 16 of the elongated hand grip 14.

The scraper 12 further includes the elongated hand grip 14 having a transverse aperture 42 through the one end 20 thereof. Each hooked scraper blade 18 has a hole 44 therethrough. A bolt 46 having a threaded shaft 48 extends up through the hole 44 in one hooked scraper blade 18 and the aperture 42 in the one end 20 of the elongated hand grip 14. A wing nut 50 is engageable onto the threaded shaft 48 of the bolt 46 to removably attach the hooked scraper blade 18 to the one end 20 of the elongated hand grip 14. The other hooked scraper blades 18 not being used can be stored on top of the one end 20 of the elongated hand grip 14 on the shaft 48 of the bolt 46 below the wing nut 50 as shown in the drawings.

It is to be noted that the design of the scraper 12 is such that several scraper blades 18 can be stored in a stacked fashion as best seen in FIGS. 1, 6 and 7 and if the user so desires one of the scraper blades 18A in the stack 18B can be turned over as shown best in FIG. 7, providing a versatile scraper with two separate simultaneously available operative scraping blades.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combination scraper and file tool comprising:
   (a) said scraper including an elongated hand grip having a top recess therein and at least one hooked scraper blade removably attached to one end of said elongated hand grip;
   (b) said file tool including a file handle securable to the tang of a file blade to form a file tool with said file blade sized to fit within said top recess of said elongated hand grip; and
   (c) means for removably securing said file handle with said file tool within said top recess of said elongated hand grip so that said file tool is always handy, ready to be used independently and in conjunction with said scraper, wherein said removably securing means includes:
(i) said file handle of said file tool having a transverse slot therethrough with a pair of male projections, each said male projection on an opposite wall of said slot; and
(ii) a pair of upright fingers in said recess of said elongated hand grip of said scraper, each said finger having a female indent therein to receive one of said male projections in said slot when said file handle is placed within said top recess of said elongated hand grip.

2. A combination scraper and file tool as recited in claim 1, wherein said scraper further includes:
(a) said elongated hand grip having a transverse aperture through said one end thereof;
(b) said at least one hooked scraper blade having a hole therethrough;
(c) a bolt having a threaded shaft extending up through said hole in said at least one hooked scraper blade and said transverse aperture in said one end of said elongated hand grip; and
(d) a wing nut engageable onto said threaded shaft of said bolt to removably attach said at least one hooked scraper blade to said one end of said elongated hand grip.

3. A combination scraper and file tool as recited in claim 2, wherein said scraper further includes means for storing in a stacked fashion spare scraper blades.

4. A combination scraper and file tool as recited in claim 3, wherein said means are provided for enabling one of said stored scraper blades to be simultaneously available as a separate operative scraping blade.

* * * * *